United States Patent
Yumer et al.

(10) Patent No.: US 10,623,426 B1
(45) Date of Patent: Apr. 14, 2020

(54) BUILDING A GROUND TRUTH DATASET FOR A MACHINE LEARNING-BASED SECURITY APPLICATION

(71) Applicant: SYMANTEC CORPORATION, Mountain View, CA (US)

(72) Inventors: Leylya Yumer, Antibes (FR); Petros Efstathopoulos, Los Angeles, CA (US)

(73) Assignee: NortonLifeLock Inc., Tempe, AZ (US)

(*) Notice: Subject to any disclaimer, the term of this patent is extended or adjusted under 35 U.S.C. 154(b) by 285 days.

(21) Appl. No.: 15/649,790

(22) Filed: Jul. 14, 2017

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1441* (2013.01); *H04L 63/20* (2013.01)

(58) Field of Classification Search
CPC .......... G06N 5/043; G06N 20/00; G06N 5/04; G06N 20/10; G06N 20/20; G06N 3/04; G06N 5/003; G06N 7/005; G16C 20/70; H04L 63/14; H04L 63/1416; H04L 63/1425; H04L 12/66; H04L 41/046; H04L 41/065; H04L 41/147; H04L 41/16; H04L 43/08; H04L 63/1441; H04L 63/1458; H04L 63/1491; H04L 9/002; H04L 9/3271; H04L 63/1408; H04L 63/1433; H04L 67/02; H04L 67/1097; H04L 67/22; H04L 67/42; G06Q 20/3821; G06Q 20/4016; G06Q 20/405; G06Q 10/10; G06Q 50/01; G06F 17/11; G06F 21/10; G06F 21/554; G06F 21/575; G06F 21/577

See application file for complete search history.

(56) References Cited

U.S. PATENT DOCUMENTS

| | | | |
|---|---|---|---|
| 2015/0264084 A1* | 9/2015 | Kashyap | H04L 63/1483 726/22 |
| 2016/0379136 A1* | 12/2016 | Chen | G06F 21/552 706/12 |

* cited by examiner

*Primary Examiner* — Abiy Getachew
(74) *Attorney, Agent, or Firm* — Maschoff Brennan

(57) ABSTRACT

Building a ground truth dataset for a machine learning-based security application. In one embodiment, a method may include identifying a set of network devices to add to a ground truth dataset. The method may also include, for each network device in the set of network devices, identifying a potentially malicious application stored on the network device, analyzing behavior of the potentially malicious application to determine whether the potentially malicious application has behaved maliciously, and if so, adding the network device to the ground truth dataset as an infected device or, if not, adding the network device to the ground truth dataset as a clean device. The method may further include training a machine learning classifier of a security application using the ground truth dataset, making a security action decision using the machine learning classifier, and performing a security action on a computer system based on the security action decision.

20 Claims, 4 Drawing Sheets

BUILDING A GROUND TRUTH DATASET FOR A MACHINE LEARNING-BASED SECURITY APPLICATION

BACKGROUND

Many modern network security applications monitor network devices on a network to attempt to determine whether any network device has been infected with a malicious application, such as a virus or a malware. The security application is typically trained to determine whether a network device is infected with a malicious application by comparing and contrasting the network device to a training dataset that includes a set of infected network devices and a set of clean network devices.

Unfortunately, however, the task of building an accurate training dataset can be difficult in modern network environments. To avoid falsely declaring that a network device is clean, training datasets will often err on the side of declaring a network device to be infected, thus resulting in a problem of having false positives in training datasets. False positives in a training dataset renders the training dataset inaccurate, thus resulting in poorly trained security applications that perpetuate the inaccurate identification of infected network devices.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for building a ground truth dataset for a machine learning-based security application may be performed, at least in part, by a computing device including at least one processor. The method may include identifying a set of network devices to add to a ground truth dataset. The method may also include, for each network device in the set of network devices, identifying a potentially malicious application stored on the network device, analyzing behavior of the potentially malicious application to determine whether the potentially malicious application has behaved maliciously, and if so, adding the network device to the ground truth dataset as an infected network device or, if not, adding the network device to the ground truth dataset as a clean network device. The method may further include training a machine learning classifier of a security application using the ground truth dataset. The method may also include making a security action decision using the machine learning classifier. The method may further include performing a security action on a computer system based on the security action decision.

In some embodiments, the machine learning classifier may include one or more of a Support Vector Machine, an Artificial Neural Network, and a Deep Learning Network, a Best-First Decision Tree, a C4.5 Tree, a Repeated Incremental Pruning to Produce Error Reduction (RIPPER), and a Fuzzy Unordered Rule Induction Algorithm (FURIA).

In some embodiments, the analyzing of the behavior of the potentially malicious application may enable a determination as to whether the potentially malicious application was ever executed on the network device and behaved maliciously. In some embodiments, the analyzing of the behavior of the potentially malicious application may include analyzing data gathered from the network device regarding the behavior of the potentially malicious application.

Also, in some embodiments, the analyzing of the behavior of the potentially malicious application may include building a behavioral graph of the behavior of the potentially malicious application on the network device. The behavioral graph may include nodes and edges, with the nodes representing a file downloaded by the potentially malicious application and the edges representing the behavior of the downloaded files. The analyzing of the behavior of the potentially malicious application may further include monitoring the behavior of the potentially malicious application for a predetermined period of time to determine whether the potentially malicious application behaved maliciously during the predetermined period of time. The potentially malicious application may be determined to have behaved maliciously if, during the predetermined period of time, the potentially malicious application downloads a file known to be malicious, downloads a file from a URL known to be malicious, and/or exhibits any of the behavior listed for the potentially malicious application in a behavioral malware detection application, such as an application that employs file behavioral analysis logs.

Further, in some embodiments, the identifying of the potentially malicious application may include identifying the potentially malicious application in a list of potentially malicious applications. In some embodiments, the list of potentially malicious applications may include one or more of Anti-Virus (AV) telemetry data, IPS telemetry data, file reputation telemetry data, and file downloads telemetry data. In some embodiments, the identifying of the potentially malicious application may include identifying the potentially malicious application by identifying potentially malicious behavior of the potentially malicious application using a network-based malware detection application configured to detect one or more of a network connection to a command and control server, sending spam, data exfiltration attempts, and downloading malware.

Also, in some embodiments, the making of the security action decision may include one or more of making a decision that a website is likely malicious, making a decision that the computer system is infected with an application that is likely malicious, making a decision that an extension application of a browser application of the computer system is likely malicious, and making a decision that an email on the computer system is likely malicious. In some embodiments, the performing of the security action may include blocking the computer system from having access to the website, at least partially blocking the computer system from having access to a network, at least partially blocking the extension application from sending data over a network, and quarantining the email from being accessed on the computer system.

Also, in some embodiments, one or more non-transitory computer-readable media may include one or more computer-readable instructions that, when executed by one or more processors, cause the one or more processors to perform a method for building a ground truth dataset for a machine learning-based security application.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
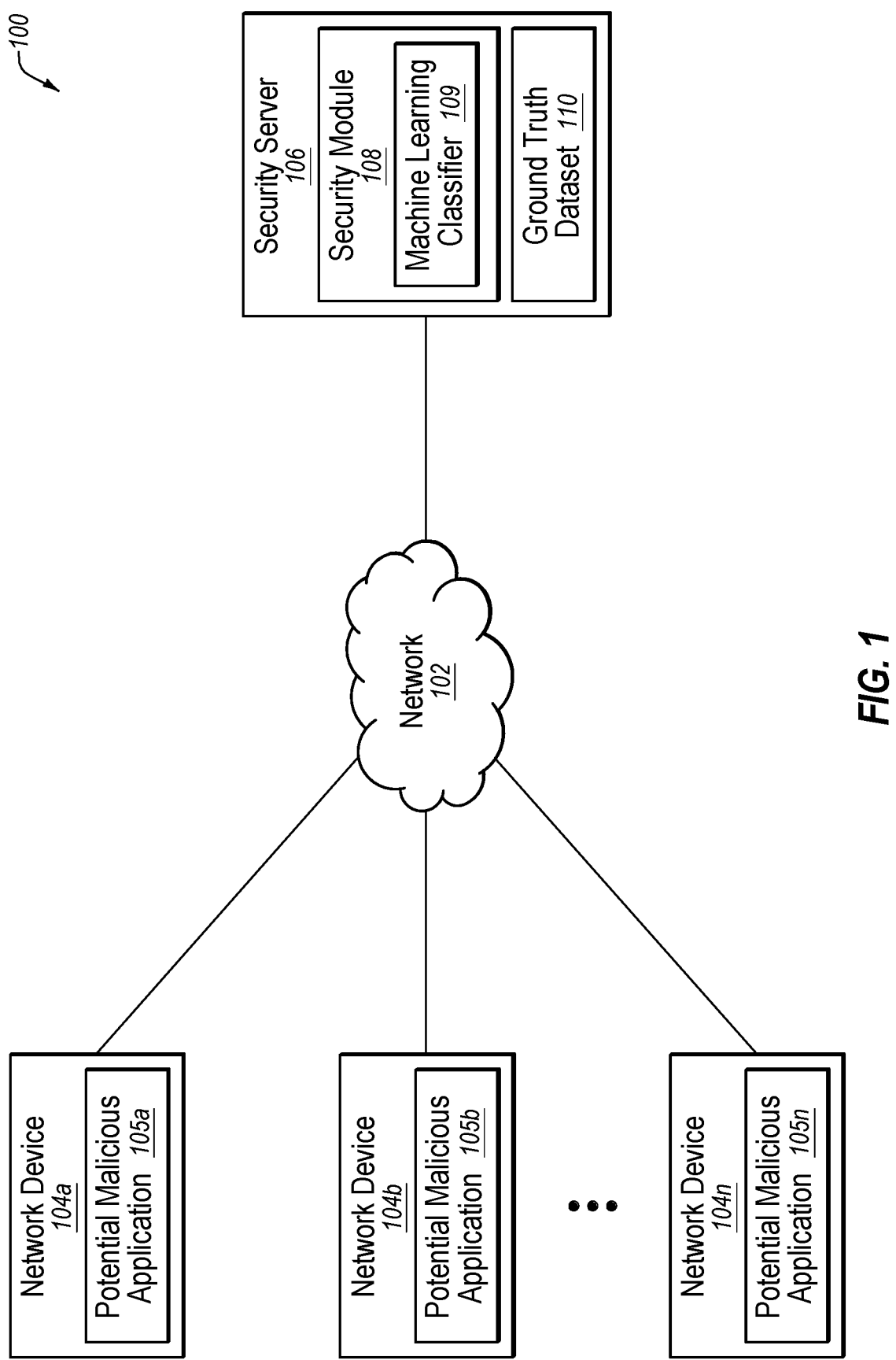
FIG. 1 illustrates an example system configured for building a ground truth dataset for a machine learning-based security application.

Some embodiments in this disclosure relate to building a ground truth dataset for a machine learning-based security application.

Machine learning-based security applications may monitor network devices on a network to attempt to determine whether any network device has been infected with a malicious application such as a virus or a malware. For example, a machine learning classifier of a machine learning-based security application may be trained to determine whether network devices are infected with malicious applications using a training dataset that includes a set of infected network devices and a set of clean network devices.

Unfortunately, however, the task of building an accurate training dataset may be difficult due to a tendency on the part of the builder of a ground truth dataset wishing to err on the side of declaring a network device to be infected, thus resulting in a problem of having false positives in conventional training datasets. For example, where a potentially malicious application is detected on a network device, the builder of a conventional training dataset may declare the network device as being infected without first confirming that the potentially malicious application was ever executed on the network device and/or without first confirming that the potentially malicious application ever exhibited any malicious behavior on the network device. This may result in a false positive where the potentially malicious application never was executed and/or where the potentially malicious application never exhibited any malicious behavior on the network device. False positives in a conventional training dataset render the training dataset inaccurate. When a machine learning classifier of a machine learning-based security application is then trained on the inaccurate training dataset, the result is a poorly trained machine learning-based security application that perpetuates the inaccurate identification of infected network devices.

The embodiments disclosed herein may provide various benefits. In particular, the embodiments disclosed herein may, for example, enable building a ground truth dataset for a machine learning-based security application that may be more accurate than conventional training datasets.

In some embodiments, building a ground truth dataset for a machine learning-based security application may include not only identifying whether a potentially malicious application is stored on a network device, but also determining whether the potentially malicious application was ever executed on the network device and/or whether the potentially malicious application ever exhibited any malicious behavior on the network device. If so, the network device may be added to the ground truth dataset as an infected network device. If not, the network device may be added to the ground truth dataset as a clean network device. A machine learning classifier of a security application may then be trained using the ground truth dataset, and then the machine learning classifier may be employed to make a security action decision and perform a security action on a computer system based on the security action decision. Since the machine learning classifier was trained using a ground truth dataset with fewer false positives than conventional training datasets, the machine learning classifier may more accurately identify infected network devices, resulting in more accurate security action decisions.

Turning to the figures, FIG. 1 illustrates an example system 100 configured for building a ground truth dataset for a machine learning-based security application. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
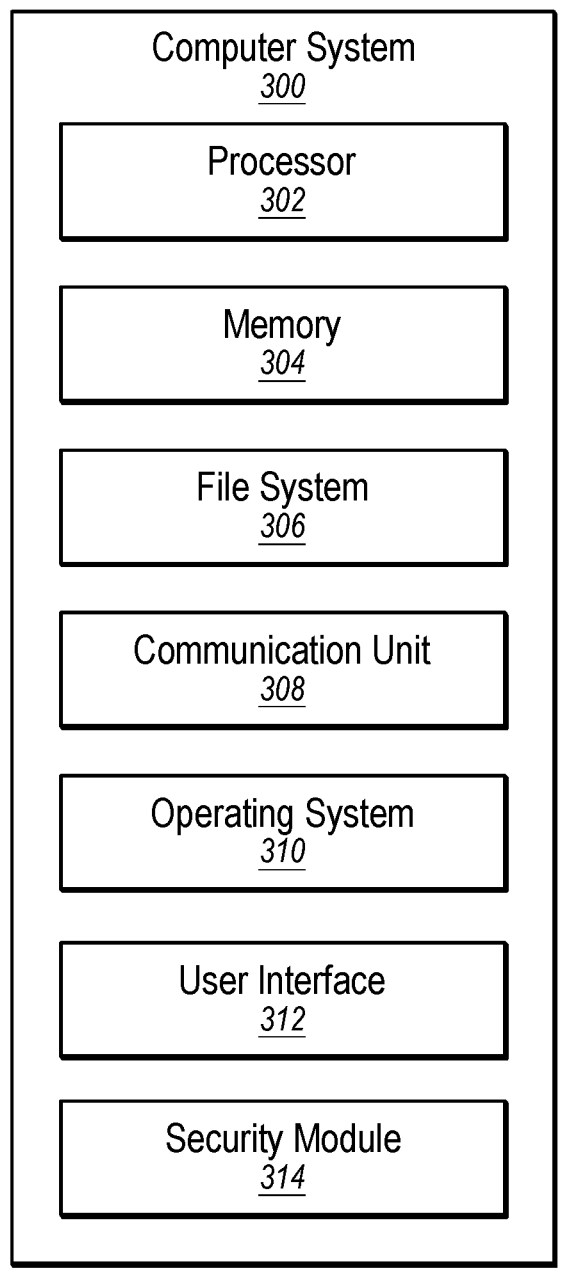
FIG. 3 illustrates an example computer system that may be employed in building a ground truth dataset for a machine learning-based security application.

In some embodiments, each of the network devices 104a-104n may be any computer system capable of communicating over the network 102, examples of which are disclosed herein in connection with the computer system 300 of FIG. 3. The network devices 104a-104n may include potentially malicious applications 105a-105n, respectively. In some embodiments, a malicious application may include one or more of a spyware, a virus, a worm, a logic bomb, a trapdoor, a Trojan horse, a Remote Admin Trojan (RAT), a malware, a mobile malicious code, a malicious font, and a rootkit. When any of the potentially malicious applications 105a-105n is determined to be an actual malicious application because it exhibits malicious behavior, the corresponding one of the network devices 104a-104n may be determined to be infected. In contrast, when any of the potentially malicious applications 105a-105n is determined to not actually be a malicious application because it does not exhibit malicious behavior, the corresponding one of the network devices 104a-104n may be determined to be clean.

In some embodiments, the security server 106 may be any computer system capable of communicating over the network 102 and capable of monitoring the network devices 104a-104n for infections with malicious applications (in real-time and/or after-the-fact by analyzing data), examples of which are disclosed herein in connection with the computer system 300 of FIG. 3. In some embodiments, the security server 106 may include a security module 108 that may be configured to build a ground truth dataset 110 for a machine learning-based security application. In some embodiments, the security module 108 itself may include a machine learning classifier 109 and may be configured to function as a machine learning-based security application that monitors the network devices 104a-104n to determine whether any of which is infected with a malicious application. In some embodiments, the security module 108 may include, or be part of, a User Behavior Analytics (UBA) application and/or a Security Information and Event Management (SIEM) application. In some embodiments, the machine learning classifier may include one or more of a Support Vector Machine, an Artificial Neural Network, and a Deep Learning Network, a Best-First Decision Tree, a C4.5 Tree, a Repeated Incremental Pruning to Produce Error Reduction (RIPPER), and a Fuzzy Unordered Rule Induction Algorithm (FURIA).

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1. For example, instead of a single security module, the system 100 may include multiple security modules, one of which is employed in building the ground truth dataset 110 and another of which (which may be included on the security server 106 or on another server or computer system) includes the machine learning classifier 109 that is trained on the ground truth dataset 110 and is configured to function as a machine learning-based security application. Further, in some embodiments, the ground truth dataset 110 may be employed by a variety of different machine learning-based security applications on a variety of different computer systems to train machine learning classifiers that are then used to detect infected network devices.

Figure 2A:
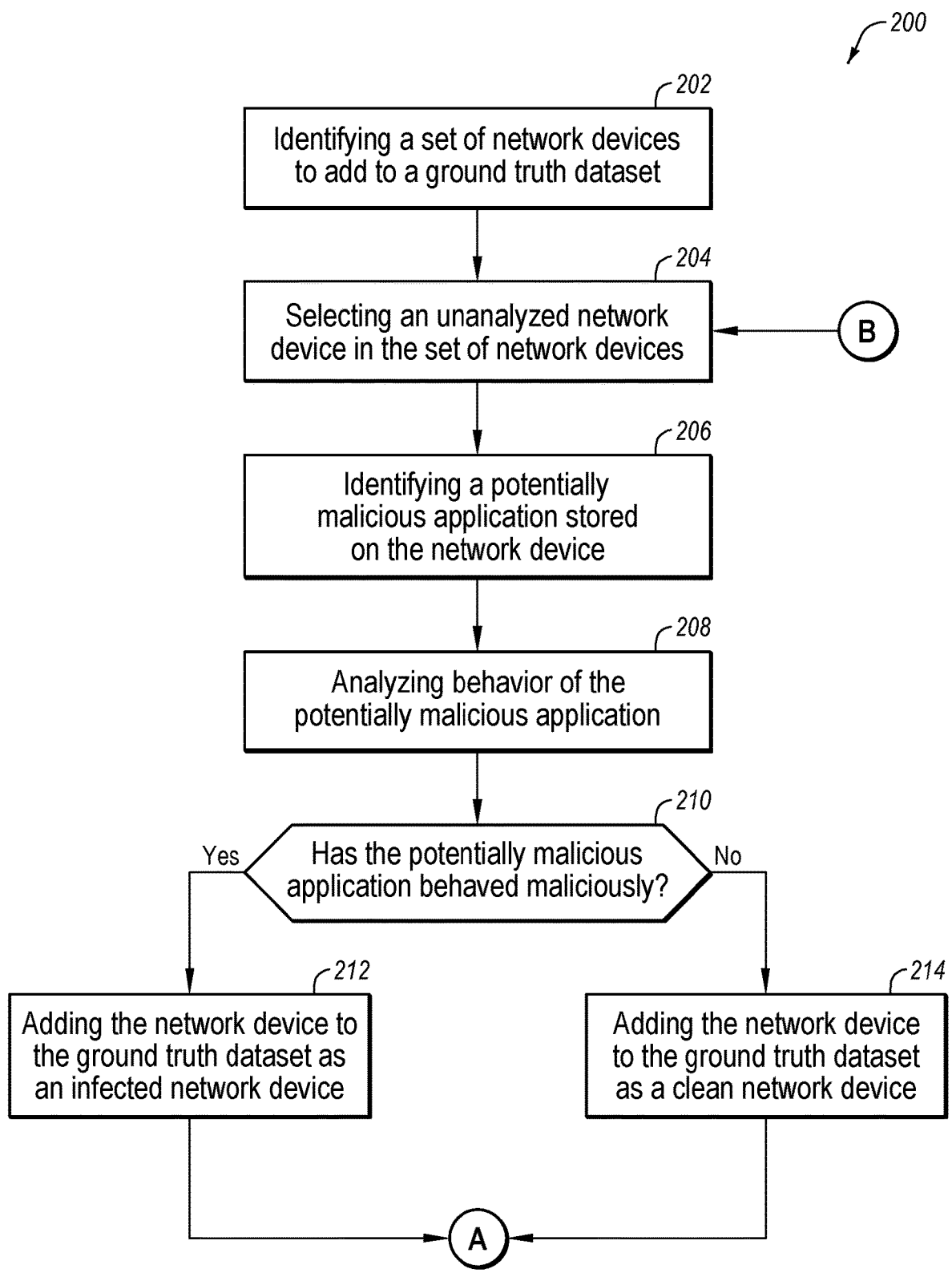
FIGS. 2A-2B are a flowchart of an example method for building a ground truth dataset for a machine learning-based security application.
Figure 2B:
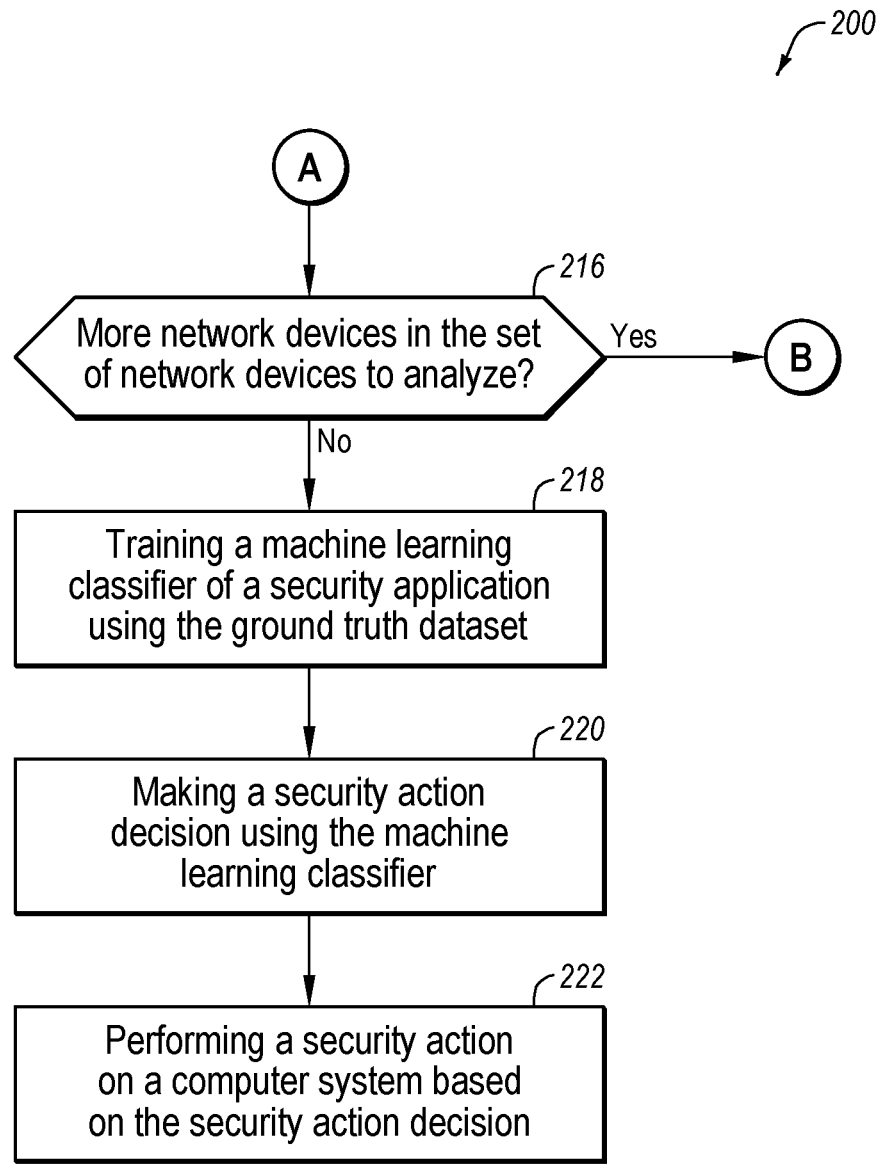

FIGS. 2A-2B are a flowchart of an example method 200 for building a ground truth dataset for a machine learning-based security application. The method 200 may be performed, in some embodiments, by a device or system, such as by the security module 108 executing on the security server 106 of FIG. 1. In these and other embodiments, the method 200 may be performed by one or more processors based on one or more computer-readable instructions stored on one or more non-transitory computer-readable media. The method 200 will now be described in connection with FIGS. 1 and 2A-2B.

The method 200 may include, at block 202, identifying a set of network devices to add to a ground truth dataset. For example, the security module 108 may identify, at block 202, the set of network devices 104a-104b to add to the ground truth dataset 110.

The method 200 may include, at block 204, selecting an unanalyzed network device in the set of network devices. For example, the security module 108 may select, at block 204, the network device 104a as an unanalyzed network device in the set of network devices 104a-104b.

The method 200 may include, at block 206, identifying a potentially malicious application stored on the network device. For example, the security module 108 may identify, at block 206, the potentially malicious application 105a stored on the network device 104a.

In some embodiments, the identifying, at block 206, of the potentially malicious application may include identifying the potentially malicious application in a list of potentially malicious applications. The list of potentially malicious applications may include one or more of Anti-Virus (AV) telemetry data, IPS telemetry data, file reputation telemetry data, and file downloads telemetry data. For example, the security module 108 may identify, at block 206, the potentially malicious application 105a (such as a binary file of the potentially malicious application 105a that is identified by a unique file identifier and/or a hash of the binary file) in a list of potentially malicious applications found in one or more of Anti-Virus (AV) telemetry data, IPS telemetry data, file reputation telemetry data, and file downloads telemetry data.

In some embodiments, the identifying, at block 206, of the potentially malicious application may include identifying the potentially malicious application by identifying potentially malicious behavior of the potentially malicious application using a network-based malware detection application configured to detect one or more of a network connection to a command and control server, sending spam, data exfiltration attempts, and downloading malware. For example, the security module 108 may identify, at block 206, the potentially malicious application 105a by identifying potentially malicious behavior of the potentially malicious application 105a using a network-based malware detection application configured to detect one or more of a network connection to a command and control server, sending spam, data exfiltration attempts, and downloading malware, The method 200 may include, at block 208, analyzing behavior of the potentially malicious application. For example, the security module 108 may analyze, at block 208, behavior of the potentially malicious application 105a, either in real-time or by analyzing data gathered from the network device 104a.

In some embodiments, the analyzing, at block 208, of the behavior of the potentially malicious application may include analyzing data gathered from the network device regarding the behavior of the potentially malicious application. For example, the security module 108 may analyze, at block 208, data gathered from the network device 104a regarding the behavior of the potentially malicious application 105a.

In some embodiments, the analyzing, at block 208, of the behavior of the potentially malicious application may include building a behavioral graph of the behavior of the potentially malicious application on the network device. The behavioral graph may include nodes and edges, with the nodes representing a file downloaded by the potentially malicious application and the edges representing the behavior of the downloaded files. For example, the security module 108 may build, at block 208, a behavioral graph of the behavior of the potentially malicious application 105a on the network device 104a. In this example, the behavioral graph may include a first node representing a binary file of the potentially malicious application 105a. If the binary file downloads another file, the security module 108 may add another node to the behavioral graph representing the downloaded file and may add an edge to the behavioral graph between the two nodes representing the downloading behavior. If the downloaded file is determined to be a malicious file, the downloading of the malicious file may be determined to be malicious behavior. It is understood that the example of a behavioral graph focused on the downloading of files is just one example, and other behavioral graphs could focus instead on other types of behaviors of potentially malicious applications. For example, a behavioral graph may focus on other behaviors such as establishing a network connection to a command and control server, sending spam, and data exfiltration attempts.

In some embodiments, the analyzing, at block 208, of the behavior of the potentially malicious application may include monitoring the behavior of the potentially malicious application for a predetermined period of time to determine whether the potentially malicious application behaved maliciously during the predetermined period of time. The potentially malicious application may be determined to have behaved maliciously if, during the predetermined period of time, the potentially malicious application, for example, downloads a file known to be malicious, downloads a file from a URL known to be malicious, and/or exhibits any of the behavior listed for the potentially malicious application in a behavioral malware detection application, such as an application that employs file behavioral analysis logs. For example, the security module 108 may monitor, at block 208, the behavior of the potentially malicious application 105a for one week to determine whether the potentially malicious application 105a behaved maliciously during the week of monitoring. If, during the week of monitoring, the potentially malicious application 105a downloads a file known to be malicious, downloads a file from a URL known to be malicious, and/or exhibits any of the behavior listed for the potentially malicious application 105a (such as for a binary file of the potentially malicious application 105a) in a behavioral malware detection application, such as an application that employs file behavioral analysis logs, then the security module 108 may determine that the potentially malicious application 105a behaved maliciously during the week of monitoring.

The method 200 may include, at decision block 210, determining whether the potentially malicious application has behaved maliciously. If so (Yes at decision block 210), the method 200 may include, at block 212, adding the network device to the ground truth dataset as an infected network device. If not (No at decision block 210), the method 200 may include, at block 214, adding the network device to the ground truth dataset as a clean network device. For example, the security module 108 may determine, at decision block 210, whether the potentially malicious application 105a has behaved maliciously. If so, the security module 108 may add the network device 104a to the ground truth dataset 110 as a clean network device. If not, the security module 108 may add the network device 104a to the ground truth dataset 110 as an infected network device.

The method 200 may include, at decision block 216, determining whether there are more network devices in the set of network devices to analyze. If so (Yes at decision block 216), the method 200 may return to block 204. If not (No at decision block 216), the method 200 may proceed to block 218. For example, the security module 108 may determine, at decision block 216, whether there are more network devices in the set of network devices 104a-104b (which was identified at block 202) to analyze. If so, such as this example, the security module 108 may return to block 204 and repeat blocks 204-214 on the network device 104b. If not, such as after blocks 204-214 have been performed for the entire set of network devices 104a-104b, the security module 108 may proceed to block 218.

The method 200 may include, at block 218, training a machine learning classifier of a security application using the ground truth dataset. For example, the security module 108, acting as a security application, may train, at block 218, the machine learning classifier 109 using the ground truth dataset 110.

The method 200 may include, at block 220, making a security action decision using the machine learning classifier. For example, the security module 108, acting as a security application, may make, at block 220, a security action decision using the machine learning classifier 109.

In some embodiments, the making, at block 220, of the security action decision may include one or more of making a decision that a website is likely malicious, making a decision that a computer system is infected with an application that is likely malicious, making a decision that an extension application of a browser application of a computer system is likely malicious, and making a decision that an email on the computer system is likely malicious.

The method 200 may include, at block 222, performing a security action on a computer system based on the security action decision. For example, the security module 108, acting as a security application, may perform, at block 222, a security action on the network device 104n based on the security action decision.

In some embodiments, the performing, at block 222, of the security action may include blocking the computer system from having access to the website, at least partially blocking the computer system from having access to a network, at least partially blocking the extension application from sending data over a network, and quarantining the email from being accessed on the computer system.

In some embodiments, the method 200 may result in the building of a ground truth dataset for a machine learning-based security application that may be more accurate (e.g., with fewer false positives) than conventional training datasets. The method 200 may then result in a machine learning classifier of a security application being trained using the ground truth dataset, and then the machine learning classifier may be employed to make a security action decision and perform a security action on a computer system based on the security action decision. Since the machine learning classifier was trained using a ground truth dataset with fewer false positives than conventional training datasets, the machine learning classifier may more accurately identify infected network devices, resulting in more accurate security action decisions.

Although the blocks of the method 200 are illustrated in FIGS. 2A-2B as discrete blocks, various blocks may be divided into additional blocks, combined into fewer blocks, reordered, expanded, or eliminated, depending on the desired implementation. For example, in some embodiments, blocks 202-216 may be performed without performing blocks 218-222. Also, in some embodiments, block 222 may be eliminated or may be performed by a network administrator or other entity that is different from the entity performing the other blocks of the method 200. Similarly, in some embodiments, blocks 202-216 may be performed by an entity that is different from the entity performing the other blocks of the method 200. Further, in some embodiments, one or more of blocks 202-216 may be performed in parallel with the performance of one or more of blocks 218-222.

Further, it is understood that the method 200 may improve the functioning of a network environment. For example, the functioning of the security server 106 or any of the network devices 104a-104n of FIG. 1 may itself be improved by the method 200. For example, any of these computer systems may be improved by the building of a ground truth dataset for a machine learning-based security application that may be more accurate (e.g., with fewer false positives) than conventional training datasets, and then using the machine learning-based security application to more accurately detect infected computer systems.

Also, the method 200 may improve the technical field of detecting and securing infected network devices. Building a more accurate ground truth dataset, and then training a machine learning classifier of a security application on the ground truth dataset, is an improvement over security applications being trained on conventional and less accurate training datasets.

FIG. 3 illustrates an example computer system 300 that may be employed in building a ground truth dataset for a machine learning-based security application. In some embodiments, the computer system 300 may be part of any of the systems or devices described in this disclosure. For example, the computer system 300 may be part of any of the network devices 104a-104n or the security server 106 of FIG. 1.

The computer system 300 may include a processor 302, a memory 304, a file system 306, a communication unit 308, an operating system 310, a user interface 312, and a security module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more blocks of the method 200 of FIGS. 2A-2B.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more blocks of the method 200 of FIGS. 2A-2B. These computer-executable instructions may be included, for example, in the operating system 310, in one or more applications, such as the security module 314, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The security module 314 may be one or more computer-readable instructions stored on one or more non-transitory computer-readable media, such as the memory 304 or the file system 306, that, when executed by the processor 302, is configured to perform one or more blocks of the method 200 of FIGS. 2A-2B. In some embodiments, the security module 314 may be part of the operating system 310 or may be part of an application of the computer system 300, or may be some combination thereof. In some embodiments, the security module 314 may function as the security module 108 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for building a ground truth dataset for a machine learning-based security application, at least a portion of the method being performed by a computing device comprising at least one processor, the method comprising:
   identifying a set of network devices to be added to a ground truth dataset;
   for each network device in the set of network devices to be added to a ground truth dataset:
      identifying a potentially malicious application stored on the network device;
      analyzing behavior of the potentially malicious application on the network device to determine whether the potentially malicious application has behaved maliciously on the network device; and
      if so, adding the network device to the ground truth dataset as an infected network device or, if not, adding the network device to the ground truth dataset as a clean network device;
   training a machine learning classifier of a security application using the ground truth dataset;
   making a security action decision using the machine learning classifier; and
   performing a security action on a computer system based on the security action decision.

2. The method of claim 1, wherein the analyzing of the behavior of the potentially malicious application on the network device comprises analyzing data gathered from the network device regarding the behavior of the potentially malicious application on the network device.

3. The method of claim 1, wherein the analyzing of the behavior of the potentially malicious application on the network device comprises building a behavioral graph of the behavior of the potentially malicious application on the network device.

4. The method of claim 3, wherein the behavioral graph comprises nodes and edges, the nodes representing files downloaded by the potentially malicious application to the network device and the edges representing the behavior of the downloaded files on the network device.

5. The method of claim 1, wherein the analyzing of the behavior of the potentially malicious application on the network device further comprises monitoring the behavior of the potentially malicious application on the network device for a predetermined period of time to determine whether the potentially malicious application behaved maliciously on the network device during the predetermined period of time.

6. The method of claim 5, wherein the potentially malicious application is determined to have behaved maliciously on the network device if, during the predetermined period of time, the potentially malicious application downloads a file known to be malicious to the network device and/or the potentially malicious application downloads a file from a URL known to be malicious to the network device.

7. The method of claim 5, wherein the potentially malicious application is determined to have behaved maliciously on the network device if, during the predetermined period of time, the potentially malicious application exhibits any of the behavior on the network device that is listed for the potentially malicious application in a behavioral malware detection application.

8. The method of claim 7, wherein the behavioral malware detection application comprises an application that employs file behavioral analysis logs.

9. The method of claim 1, wherein the identifying of the potentially malicious application comprises identifying the potentially malicious application in a list of potentially malicious applications.

10. The method of claim 9, wherein the list of potentially malicious applications comprises one or more of Anti-Virus (AV) telemetry data, IPS telemetry data, file reputation telemetry data, and file downloads telemetry data.

11. A computer-implemented method for building a ground truth dataset for a machine learning-based security application, at least a portion of the method being performed by a computing device comprising at least one processor, the method comprising:
  identifying a set of network devices be added to a ground truth dataset;
  for each network device in the set of network devices to be added to a ground truth dataset:
    identify a potentially malicious application stored on the network device;
    analyzing data gathered from the network device regarding behavior of the potentially malicious application on the network device to determine whether the potentially malicious application was ever executed on the network device and behaved maliciously on the network device; and
    if so, adding the network device to the ground truth dataset as an infected network device or, if not, adding the network device to the ground truth dataset as a clean network device;
  training a machine learning classifier of a security application using the ground truth dataset;
  making a security action decision using the machine learning classifier; and
  performing a security action on a computer system based on the security action decision.

12. The method of claim 11, wherein:
  the analyzing of the behavior of the potentially malicious application on the network device comprises building a behavioral graph of the behavior of the potentially malicious application on the network device; and
  the behavioral graph comprises nodes and edges, the nodes representing a file downloaded by the potentially malicious application to the network device and the edges representing the behavior of the downloaded files on the network device.

13. The method of claim 11, wherein:
  the analyzing of the behavior of the potentially malicious application on the network device further comprises monitoring the behavior of the potentially malicious application on the network device for a predetermined period of time to determine whether the potentially malicious application behaved maliciously on the network device during the predetermined period of time; and
  the potentially malicious application is determined to have behaved maliciously on the network device if, during the predetermined period of time, the potentially malicious application:
    downloads a file known to be malicious to the network device;
    downloads a file from a URL known to be malicious to the network device; and/or
    exhibits any of the behavior on the network device that is listed for the potentially malicious application in a behavioral malware detection application.

14. The method of claim 11, wherein the identifying of the potentially malicious application comprises identifying the potentially malicious application in a list of potentially malicious applications.

15. The method of claim 11, wherein the identifying of the potentially malicious application comprises identifying the potentially malicious application by identifying potentially malicious behavior of the potentially malicious application on the network device using a network-based malware detection application configured to detect one or more of a network connection to a command and control server, sending spam, data exfiltration attempts, and downloading malware.

16. One or more non-transitory computer-readable media comprising one or more computer-readable instructions that, when executed by one or more processors of one or more computing devices, cause the one or more computing devices to perform a method comprising:
  identifying a set of network devices to be added to a ground truth dataset;
  for each network device in the set of network devices to be added to a ground truth dataset:
    identify a potentially malicious application stored on the network device;
    analyzing behavior of the potentially malicious application on the network device to determine whether the potentially malicious application has behaved maliciously on the network device; and
    if so, adding the network device to the ground truth dataset as an infected network device or, if not, adding the network device to the ground truth dataset as a clean network device;
  training a machine learning classifier of a security application using the ground truth dataset;
  making a security action decision using the machine learning classifier; and
  performing a security action on a computer system based on the security action decision.

17. The one or more non-transitory computer-readable media of claim 16, wherein:
  the making of the security action decision comprises one or more of making a decision that a website is likely malicious, making a decision that the computer system is infected with an application that is likely malicious, making a decision that an extension application of a browser application of the computer system is likely malicious, and making a decision that an email on the computer system is likely malicious; and
  the performing of the security action comprises one or more of blocking the computer system from having access to the website, at least partially blocking the computer system from having access to a network, at least partially blocking the extension application from sending data over a network, and quarantining the email from being accessed on the computer system.

18. The one or more non-transitory computer-readable media of claim 16, wherein the machine learning classifier comprises one or more of a Support Vector Machine, an Artificial Neural Network, and a Deep Learning Network, a Best-First Decision Tree, a C4.5 Tree, a Repeated Incremental Pruning to Produce Error Reduction (RIPPER), and a Fuzzy Unordered Rule Induction Algorithm (FURIA).

19. The one or more non-transitory computer-readable media of claim 16, wherein:
   the analyzing of the behavior of the potentially malicious application on the network device further comprises monitoring the behavior of the potentially malicious application on the network device for a predetermined period of time to determine whether the potentially malicious application behaved maliciously on the network device during the predetermined period of time; and
   the potentially malicious application is determined to have behaved maliciously on the network device if, during the predetermined period of time, the potentially malicious application:
   downloads a file known to be malicious to the network device;
   downloads a file from a URL known to be malicious to the network device; and/or
   exhibits any of the behavior on the network device that is listed for the potentially malicious application in a behavioral malware detection application.

20. The one or more non-transitory computer-readable media of claim 16, wherein the identifying of the potentially malicious application comprises:
   identifying the potentially malicious application in a list of potentially malicious applications; or
   identifying the potentially malicious application by identifying potentially malicious behavior of the potentially malicious application on the network device using a network-based malware detection application configured to detect one or more of a network connection to a command and control server, sending spam, data exfiltration attempts, and downloading malware.

* * * * *